(12) United States Patent
Cann

(10) Patent No.: US 9,482,298 B2
(45) Date of Patent: Nov. 1, 2016

(54) BRAKE CALIPER PISTON ACTUATION DEVICE

(71) Applicant: BeijingWest Industries, Co., Ltd., Beijing (CN)

(72) Inventor: Barton Everett Cann, South Lyon, MI (US)

( * ) Notice: Subject to any disclaimer, the term of this patent is extended or adjusted under 35 U.S.C. 154(b) by 0 days.

(21) Appl. No.: 14/759,628

(22) PCT Filed: Nov. 7, 2013

(86) PCT No.: PCT/CN2013/086673
§ 371 (c)(1),
(2) Date: Jul. 7, 2015

(87) PCT Pub. No.: WO2015/054935
PCT Pub. Date: Apr. 23, 2015

(65) Prior Publication Data
US 2015/0354645 A1 Dec. 10, 2015

Related U.S. Application Data

(60) Provisional application No. 61/890,913, filed on Oct. 15, 2013.

(51) Int. Cl.
*F16D 65/00* (2006.01)
*F16D 55/225* (2006.01)
*F16D 65/18* (2006.01)
(Continued)

(52) U.S. Cl.
CPC ......... *F16D 65/0068* (2013.01); *F16D 55/225* (2013.01); *F16D 65/18* (2013.01); *F16D 2055/0016* (2013.01); *F16D 2121/02* (2013.01); *F16D 2121/04* (2013.01); *F16D 2121/24* (2013.01); *F16D 2123/00* (2013.01); *F16D 2125/06* (2013.01); *F16D 2125/40* (2013.01); *F16D 2125/42* (2013.01)

(58) Field of Classification Search
CPC .. F16D 65/0068; F16D 65/18; F16D 55/225; F16D 2055/0016
See application file for complete search history.

(56) References Cited

U.S. PATENT DOCUMENTS 6,311,808 B1 11/2001 Halasy-Wimmer et al.
6,691,837 B1 2/2004 Kapaan et al.
(Continued)

FOREIGN PATENT DOCUMENTS

DE 102006033333 A1 8/2007
WO 2005005854 A1 1/2005

*Primary Examiner* — Vishal Sahni
(74) *Attorney, Agent, or Firm* — Dickinson Wright PLLC

(57) ABSTRACT

A brake caliper piston actuation device comprises a caliper housing (20) including a bore (22) extending through the caliper housing (20). An end cap closes the bore (22) and has an end cap extension (28) and a fluid port (32). A piston (40) is disposed in the bore (22). An actuation member (48) has an inner surface and an outer surface and is disposed in the bore (22) and extends axially over the piston (40) to slidably support and guide the piston (40). The inner surface of the actuation member (48) and the fluid end of the piston (40) and the end cap extension (28) define a fluid chamber (54) for containing a hydraulic fluid entering from the fluid port (32). A parking brake mechanism engages the actuation member (48) for causing axial movement of the actuation member (48). The piston (40) moves in response to the hydraulic fluid entering the fluid chamber (54) and by the parking brake mechanism advancing the actuation member (48) and pushing the piston (40) axially.

8 Claims, 4 Drawing Sheets

(51) Int. Cl.
*F16D 55/00* (2006.01)
*F16D 121/04* (2012.01)
*F16D 125/40* (2012.01)
*F16D 125/06* (2012.01)
*F16D 121/02* (2012.01)
*F16D 121/24* (2012.01)
*F16D 123/00* (2012.01)
*F16D 125/42* (2012.01)

(56) References Cited

U.S. PATENT DOCUMENTS

2014/0110196 A1* 4/2014 Burgoon ................. B60T 13/22
    188/72.3
2014/0110197 A1* 4/2014 Burgoon ................. B60T 1/065
    188/72.4

* cited by examiner

BRAKE CALIPER PISTON ACTUATION DEVICE

BACKGROUND OF THE INVENTION

1. Field of the Invention

A brake caliper assembly for use in a vehicle to provide braking force as part of a hydraulic brake system.

2. Description of the Prior Art

The brake calipers of the type to which the subject invention pertains, provide braking force when used as part of a hydraulic braking system. One such brake caliper is illustrated in U.S. Pat. No. 6,311,808 to Halasy-Wimmer et al. wherein a caliper housing includes a bore extending a length through the caliper housing along a center axis. An end cap closes the bore and includes an end cap extension extending axially and centrally into the bore. A piston having a pad end and a fluid end is disposed in the bore for movement along the center axis for providing braking force in response to the hydraulic fluid entering the bore through a fluid port and against the fluid end to move the piston axially. An electro-mechanical actuation sub-assembly is disposed centrally in the hydraulic piston for moving the piston.

The components of the parking brake mechanism are usually located inside the piston or within the hydraulic fluid chamber of the caliper in the prior art brake calipers used as part of a hydraulic brake system. Because these components are situated in such locations, they are continuously bathed in the hydraulic fluid used to move the piston axially. Hydraulic fluid is not an ideal lubricant to impede wear of the parking brake mechanism components as they contact other parking brake mechanism components. Hydraulic fluid used in vehicle braking systems offers less lubricity than what is usually desired to reduce friction between moving parts.

SUMMARY OF THE INVENTION

The invention provides such a brake caliper assembly wherein an actuation member extends axially over the fluid end of the piston and extends axially over the end cap extension thereby defining a fluid chamber for containing and separating the hydraulic fluid entering through the fluid port from the parking brake mechanism.

ADVANTAGES OF THE INVENTION

The invention is its broadest aspect provides an assembly wherein the parking brake mechanism components are completely separated from the hydraulic fluid that is used to move the piston axially. This allows the use of lubricants with proper lubricity to reduce friction and minimize wear between parking brake mechanism components as they contact the actuation member and each other while isolated from the hydraulic fluid.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
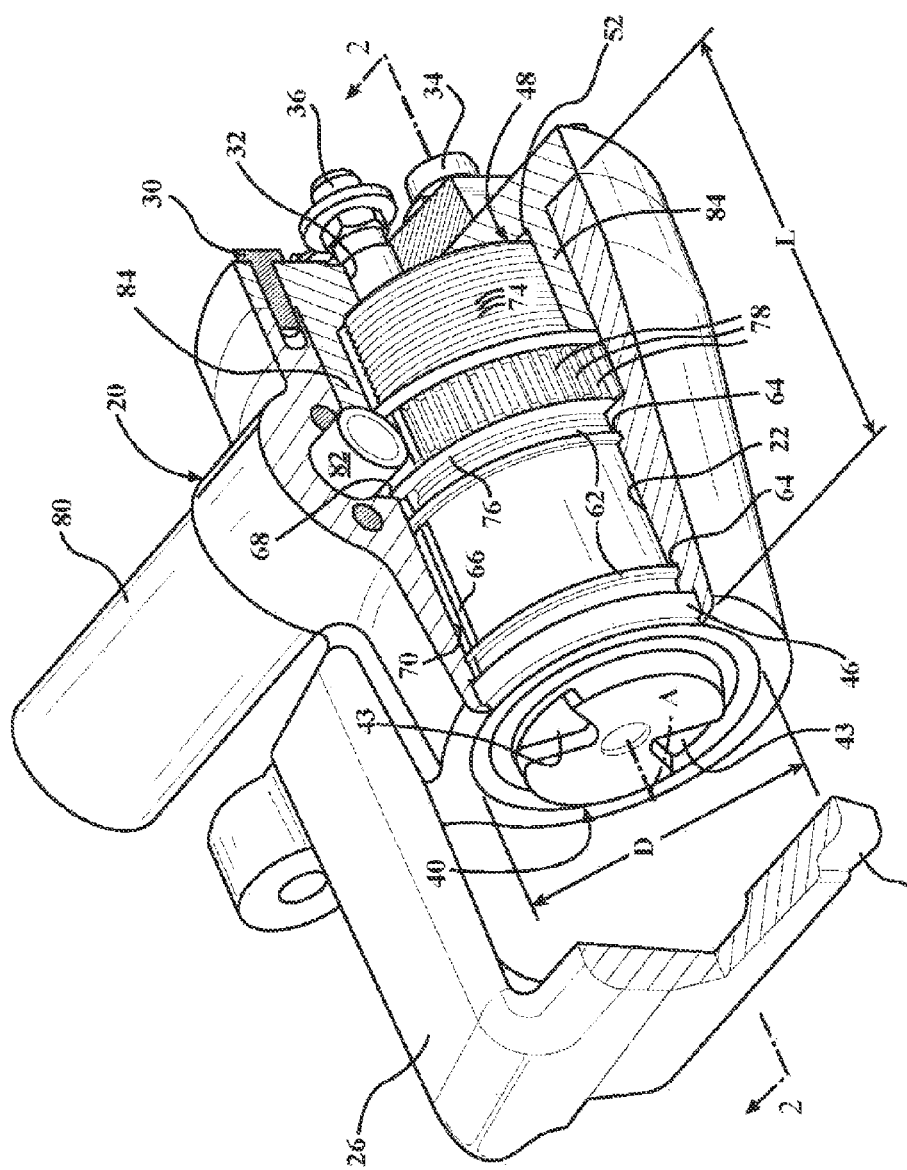
FIG. 1 is a perspective view cutaway and in cross section of an enabling embodiment of the brake caliper assembly.

Referring to the Figures, wherein like numerals indicate corresponding parts throughout the several views, a brake caliper assembly for use in a vehicle is shown in the Figures.

The assembly comprises a caliper housing 20, generally indicated, including a bore 22 that extends between an open end and a closed end. The bore 22 and has an inner diameter D and a length L and extends through the caliper housing 20 along a center axis A. The housing 20 includes a plurality of caliper fingers 24 (one shown) and a bridge 26 that extends between the open end of the bore 22 and the caliper fingers 24. The caliper fingers 24 extend downwardly from the bridge 26 to define a pad surface for supporting a brake pad.

An end cap closes the closed end of the bore 22 and has a cap extension 28 extending axially and centrally into the bore 22 along the center axis A to define a closed end of the bore 22. A plurality of fasteners 30 attaches the end cap to the housing 20 to cover the bore 22. The end cap includes a fluid port 32 with a brake line fitting 34 therein for establishing fluid communication of a hydraulic fluid through the end cap and into the bore 22. The end cap also includes a bleeder port 36 containing a bleeder valve 38 for bleeding air and the hydraulic fluid from the bore 22 through the end cap.

A piston 40, generally indicated, has a pad end facing the caliper fingers 24 and a fluid end facing the cap extension 28 and is disposed in the bore 22 for movement along the center axis A. The piston 40 provides braking force in response to the hydraulic fluid entering the bore 22 through the fluid port 32 and against the fluid end to move the piston 40 axially toward the caliper fingers 24. The piston 40 can move axially various axial distances, one of which is shown at X in FIG. 3. The piston 40 defines a stepped cavity 42 in the fluid end having a plurality of stepped diameters of decreasing dimension and extending into the fluid end for receiving the hydraulic fluid. The pad end of the piston 40 defines a plurality of indentations 43, each having a V-shape to prevent rotation of the piston 40. However, a simplified piston 40 may be used without a plurality of stepped diameters or indentations 43. An annular piston groove 44 is defined by the pad end of the piston 40. A dust boot 46 is flexibly disposed in the annular piston groove 44 and in an annular boot groove to extend between the piston 40 and the bore 22 for keeping dust out of the bore 22.

An actuation member 48, generally indicated, is tubular in shape and has an outer surface and an inner surface and a first end 50 and a second end 52. The actuation member 48 is disposed along the center axis A inside of the bore 22. The first end 50 of the actuation member 48 extends axially toward the open end of the bore 22 and is disposed over the fluid end of the piston 40 to slidably support and guide the piston 40 along the inner surface of the actuation member 48. The second end 52 of the actuation member 48 extends axially over the cap extension 28. The inner surface of the actuation member 48 and the fluid end of the piston 40 and the end cap extension 28 define a fluid chamber 54 for containing the hydraulic fluid entering from the fluid port 32.

A retainer 56 is disposed on the inner surface of the actuation member 48 and separates the piston 40 from the cap extension 28 for axially engaging the fluid end of the piston 40 to move the piston 40 axially. It should be appreciated that in the enabling embodiment, the retainer 56 takes the form of a radially inwardly extending rim, but other retainers 56 such as a snap ring disposed in an annular furrow defined by the inner surface of the actuation member 48 may be used instead. A first seal 58 is disposed in a first annular recess in the actuation member 48 to engage the piston 40 for preventing leakage of the hydraulic fluid from the fluid chamber 54 into the bore 22. A second seal 60 is disposed in a second annular recess disposed adjacent to the second end 52 to engage the end cap extension 28 for preventing leakage of the hydraulic fluid from the fluid chamber 54 into the bore 22.

A plurality of snap rings 62 are included with each disposed in one of a plurality of respective ring grooves 64 (FIG. 1) disposed annularly and axially spaced from one another and defined by the inner diameter D of the bore 22 about the actuation member 48. The outer surface of the actuation member 48 defines a channel 66 (FIG. 1) extending axially parallel to the center axis A and extending from the first end 50 to the second end 52. A shoulder 68 is defined by change in the inner diameter D of the bore 22 and is disposed midway along the length L of the bore 22. The inner diameter D of the bore 22 defines a keyway 70 (FIG. 1) extending axially along the length L of the bore 22 from the annular boot groove at the open end of the bore 22 to the shoulder 68. A key 72 (FIG. 2) is disposed in the keyway 70 of the bore 22 and slidably disposed in the channel 66 of the actuation member 48 for preventing rotation of the actuation member 48 within the bore 22 as the actuation member 48 moves axially in the bore 22. The key 72 is prevented from axial movement by engaging the snap rings 62.

Figure 3:
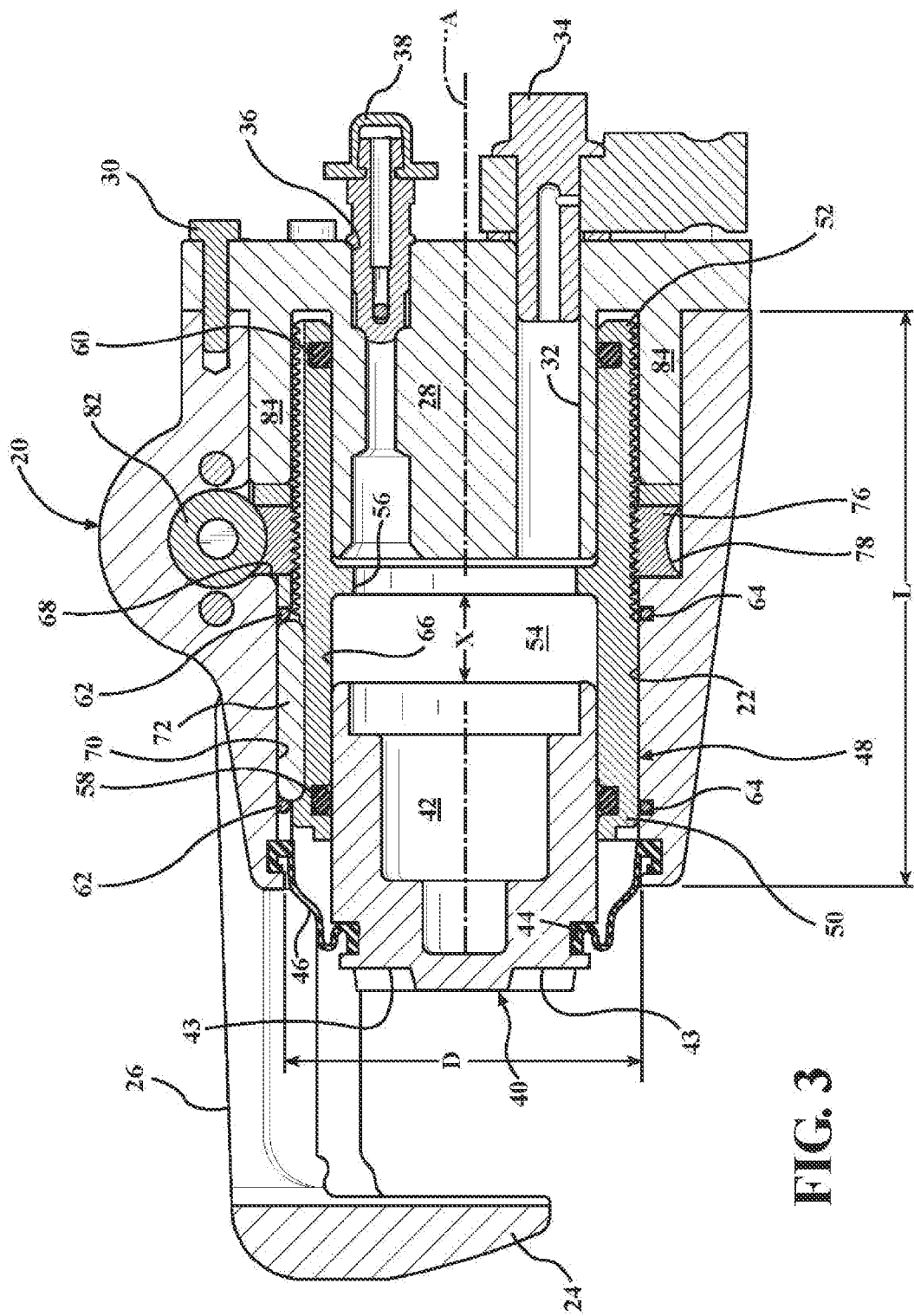
FIG. 3 is a cross-sectional view like FIG. 2 but showing the axial movement of the piston in response to the hydraulic fluid entering the bore.
Figure 4:
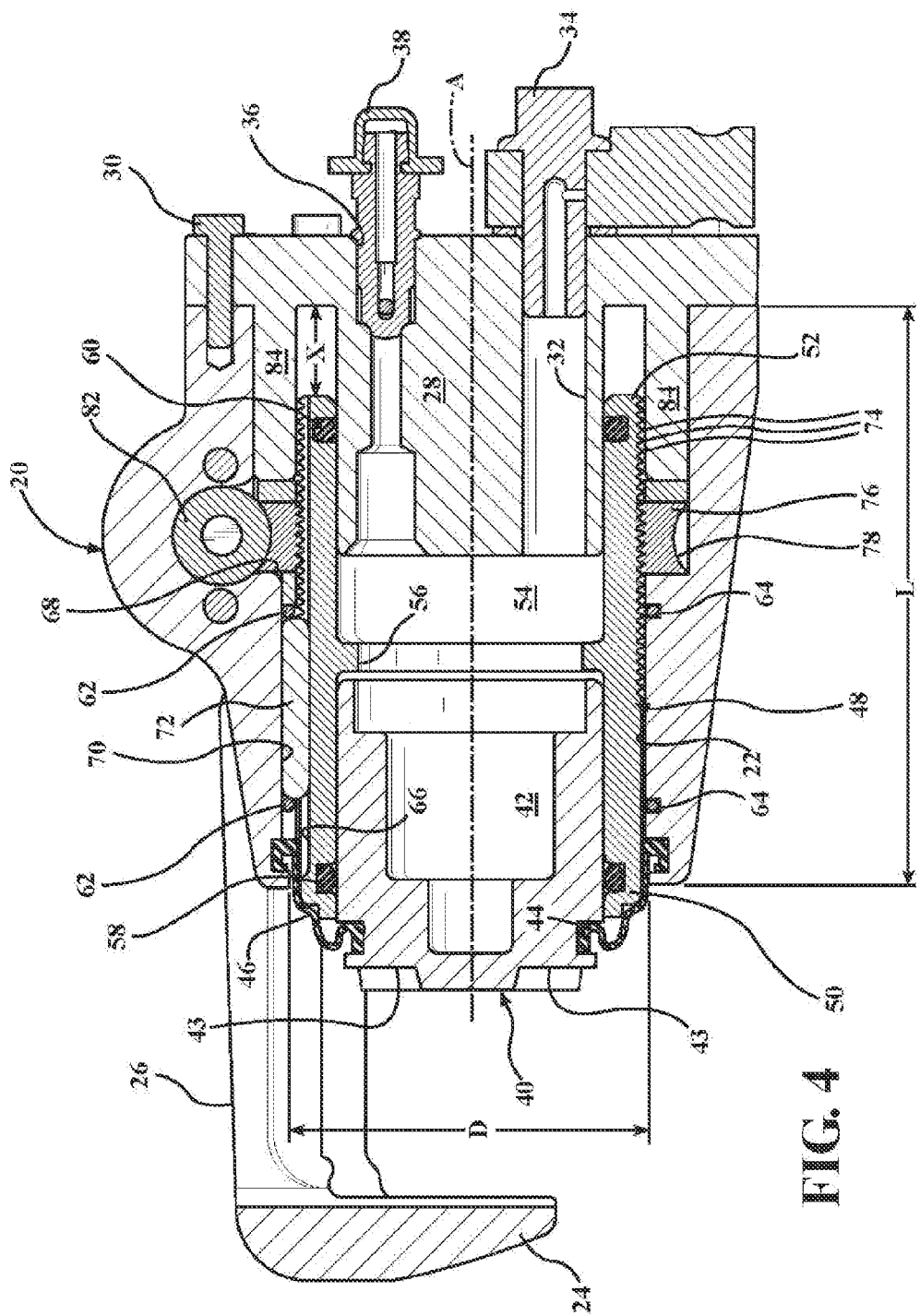
FIG. 4 is a cross-sectional view like FIG. 2 but showing the axial movement of the actuation member and the piston in response to the parking brake mechanism.

A parking brake mechanism is disposed in the housing 20 and engages the outer surface of the actuation member 48 for causing axial movement of the actuation member 48 within the bore 22 along the center axis A. The piston 40 is slidably disposed in the fluid chamber 54 for movement in response to the hydraulic fluid entering the fluid chamber 54 and acting against the fluid end of the piston 40 to push the piston 40 axially toward the caliper fingers 24, e.g, a distance X, as best shown in FIG. 3. The piston 40 can also be moved by the parking brake mechanism advancing the retainer 56 of the actuation member 48 to engage the piston 40 and to push the piston 40 axially toward the caliper fingers 24, e.g., also a distance X, as best shown in FIG. 4. The piston 40 has moved the same distance X in both examples illustrated in FIGS. 3 and 4.

Figure 2:
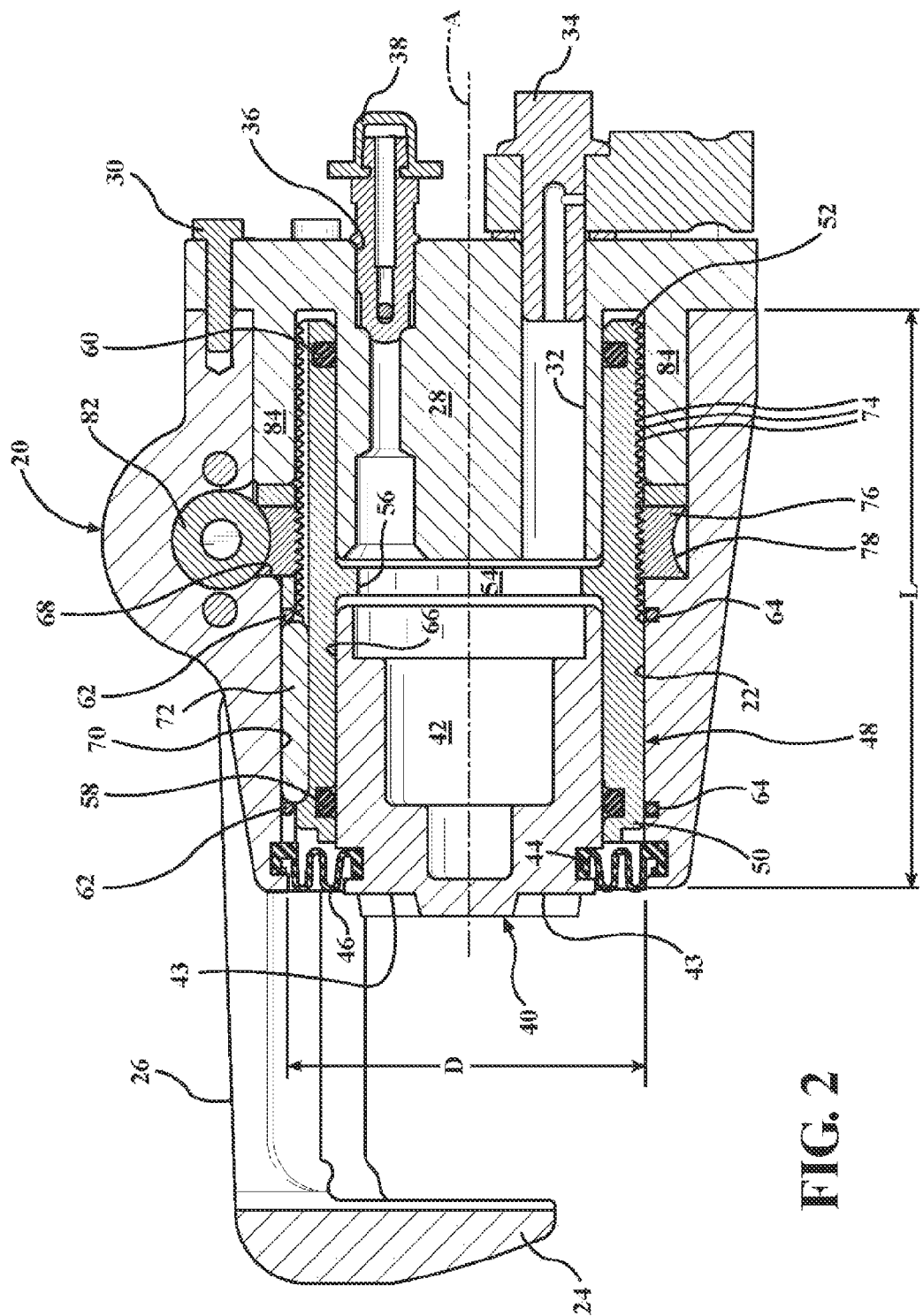
FIG. 2 is a cross-sectional view taken along line 2-2 of FIG. 1.

The parking brake mechanism comprises a plurality of actuation member threads 74 disposed on the outer surface of the actuation member 48 and a worm gear 76. The worm gear 76 has an interior surface and an exterior surface and is disposed annularly about the actuation member 48 and abutting the shoulder 68 of the bore 22. A plurality of drive threads is disposed on the interior surface of the worm gear 76 for threadedly engaging the actuation member threads 74, as best shown in FIGS. 2-4. A plurality of teeth 78 is disposed on the exterior surface of the worm gear 76. A motor sub-assembly 80 is disposed on the housing 20 to extend transversely in a perpendicular relationship to the center axis A and includes an electric motor and a plurality of motor fasteners attaching the motor to the caliper housing 20. A worm 82 is attached to and rotated by the motor sub-assembly 80 (FIG. 1). The worm 82 engages the teeth 78 of the worm gear 76 for rotating the worm gear 76 about the actuation member 48 as the motor is activated causing axial movement of the actuation member 48 within the bore 22 along the center axis A to move the piston 40 axially, as best shown in FIG. 4.

A bearing sub-assembly is disposed adjacent to the worm gear 76 and against the end cap for preventing axial motion of the worm gear 76 along the actuation member 48 as the worm gear 76 rotates about the actuation member 48. The bearing sub-assembly includes a plurality of thrust washers and a thrust bearing for reducing friction between the worm gear 76 and the end cap. The end cap has an annular projection 84 (FIG. 1) concentric to the center axis A and extending axially along and about the second end 52 of the actuation member 48 to an annular abutment for engaging and holding the bearing sub-assembly in contact with the worm gear 76 and the worm gear 76 against the shoulder 68. Because the parking brake mechanism is not disposed in the fluid chamber 54, fewer seals are required as compared to prior art assemblies which dispose the parking brake mechanism inside the fluid chamber 54.

The parking brake mechanism could also comprise a lever and a cam, pawl and rack, or other similar type of mechanism for causing axial movement of the actuation member 48 within the bore 22 along the center axis A.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A brake caliper assembly for use in a vehicle comprising;
    a caliper housing including a bore extending between an open end and a closed end with and having an inner diameter and a length extending through said caliper housing along a center axis,
    an end cap closing said closed end of said bore and having an end cap extension extending axially and centrally into said bore,
    said end cap including a fluid port establishing fluid communication of a hydraulic fluid through said end cap and into said bore,
    a piston having a pad end extending from said open end of said bore and a fluid end and disposed in said bore for movement along said center axis for providing braking force in response to the hydraulic fluid entering said bore through said fluid port and against said fluid end to move said piston axially,
    an actuation member being tubular in shape and having an outer surface and an inner surface and a first end and a second end and disposed along said center axis inside of said bore and extending axially over said end cap extension to move said piston axially,
    a parking brake mechanism engaging said outer surface of said actuation member for causing axial movement of said actuation member within said bore along said center axis,
    and characterized by
    said actuation member extending axially over said fluid end of said piston toward said open end of said bore and extending axially over said end cap extension and defining a fluid chamber between said fluid end of said piston and said inner surface of said actuation member and said end cap extension for containing and separating the hydraulic fluid entering through said fluid port from said outer surface of said actuation member and said parking brake mechanism.

2. An assembly as set forth in claim 1 further comprising a retainer disposed on said inner surface of said actuation member for axially engaging said fluid end of said piston to move said piston axially.

3. An assembly as set forth in claim 1 including a first seal disposed adjacent to said first end and engaging said piston, and a second seal disposed adjacent to said second end and engaging said end cap extension for preventing leakage of the hydraulic fluid from said fluid chamber into said bore.

4. An assembly as set forth in claim 1 further comprising a key interconnecting said said actuation member and said housing for preventing rotation of said actuation member within said bore as said actuation member moves axially in said bore.

5. An assembly as set forth in claim 4 wherein said outer surface of said actuation member defines a channel extending axially parallel to said center axis and extending from said first end to said second end, said inner diameter of said bore defines a keyway extending axially along said length of said bore from end of said bore opposite said end cap to said shoulder, said bore presenting a plurality of ring grooves disposed annularly and axially spaced from one another and defined by said inner diameter of said bore about said actuation member, a plurality of snap rings each disposed in one of said respective ring grooves, said key disposed in said keyway of said bore and slidably disposed in said channel of said actuation member and prevented from axial movement by engaging said snap rings for preventing rotation of said actuation member within said bore as said actuation member moves axially in said bore.

6. An assembly as set forth in claim 1 including a shoulder defined by change in said inner diameter of said bore and disposed midway along said length of said bore, said end cap including an annular projection concentric to said center axis and extending axially along and about said actuation member toward said shoulder for holding said worm gear against said shoulder.

7. An assembly as set forth in claim 6 wherein said parking brake mechanism is disposed between said shoulder and said annular projection.

8. An assembly as set forth in claim 7 wherein said parking brake mechanism comprises a plurality of actuation member threads disposed on said outer surface of said actuation member, a worm gear having an interior surface and an exterior surface disposed annularly about said actuation member between said shoulder and said annular projection, a plurality of drive threads disposed on said interior surface of said worm gear and threadedly engaging said actuation member threads, a plurality of teeth disposed on said exterior surface of said worm gear, a worm engaging said teeth of said worm gear for rotating said worm gear about said actuation member causing axial movement of said actuation member along said center axis.

* * * * *